May 21, 1940.  J. R. COX  2,201,287
AUTOMATIC CHUCKING DEVICE
Filed June 30, 1937  3 Sheets-Sheet 1

INVENTOR.
JOHN R. COX.
BY Milburn & Milburn
ATTORNEYS.

May 21, 1940.  J. R. COX  2,201,287
AUTOMATIC CHUCKING DEVICE
Filed June 30, 1937  3 Sheets-Sheet 2

INVENTOR.
JOHN R. COX.
BY *Milburn and Milburn*
ATTORNEYS.

May 21, 1940.  J. R. COX  2,201,287

AUTOMATIC CHUCKING DEVICE

Filed June 30, 1937  3 Sheets-Sheet 3

INVENTOR.
JOHN R. COX.
BY *Milburn and Milburn*
ATTORNEYS.

Patented May 21, 1940

2,201,287

UNITED STATES PATENT OFFICE 2,201,287

AUTOMATIC CHUCKING DEVICE

John R. Cox, Cleveland, Ohio, assignor to Thompson Products, Inc., Cleveland, Ohio Application June 30, 1937, Serial No. 151,298

9 Claims. (Cl. 279—51)

This invention relates to an automatic chucking device which can be employed in connection with all kinds of machining or grinding operations that require chucking of the parts.

The object of this invention is to provide an improved form of device in which there is automatically effected engagement of the collet with the work upon initiation of the operation and in which there is also automatically effected disengagement of the collet from the work upon termination of the operation.

A further object is to devise an improved and simple but efficient and dependable form of mechanism for performing the intended operations and for obtaining the advantages herein specified, such mechanism including the features to be hereinafter set forth and claimed.

Other objects will appear from the following description and claims when considered together with the accompanying drawings.

It is to be understood that the present form of disclosure is merely for purposes of illustration and that there may be devised numerous modifications therein without departing from the spirit of the present invention as herein set forth and claimed.

Figure 1:
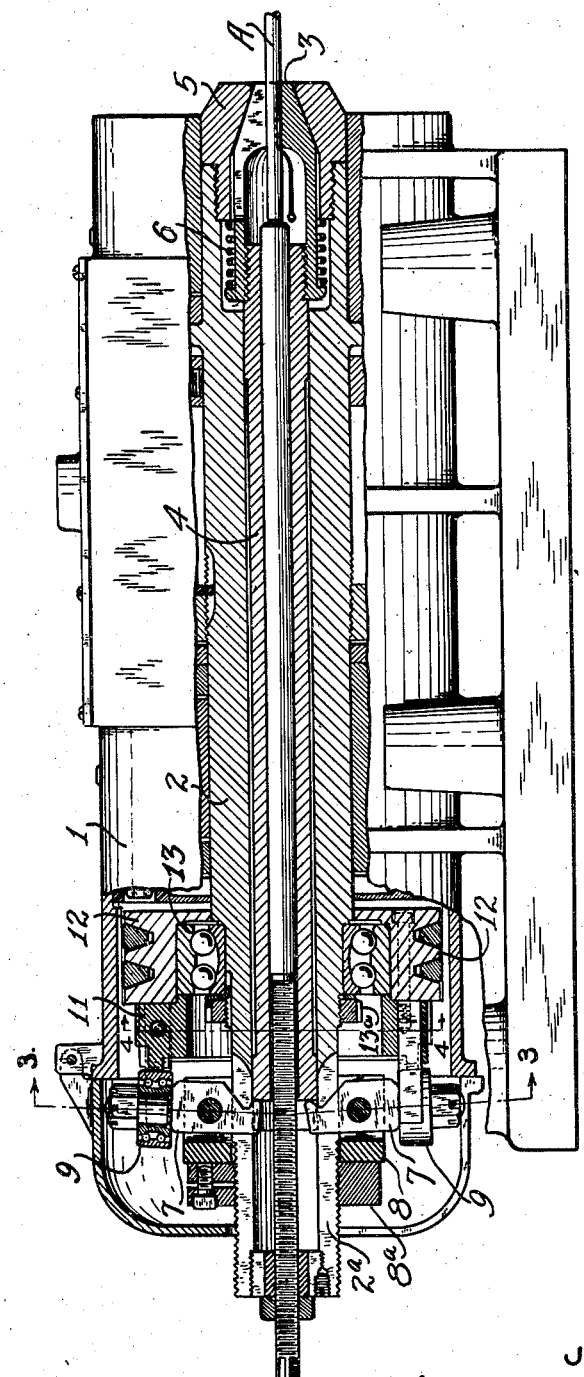
Fig. 1 is a side view of my device with part broken away so as to show the interior construction.
Figure 2:
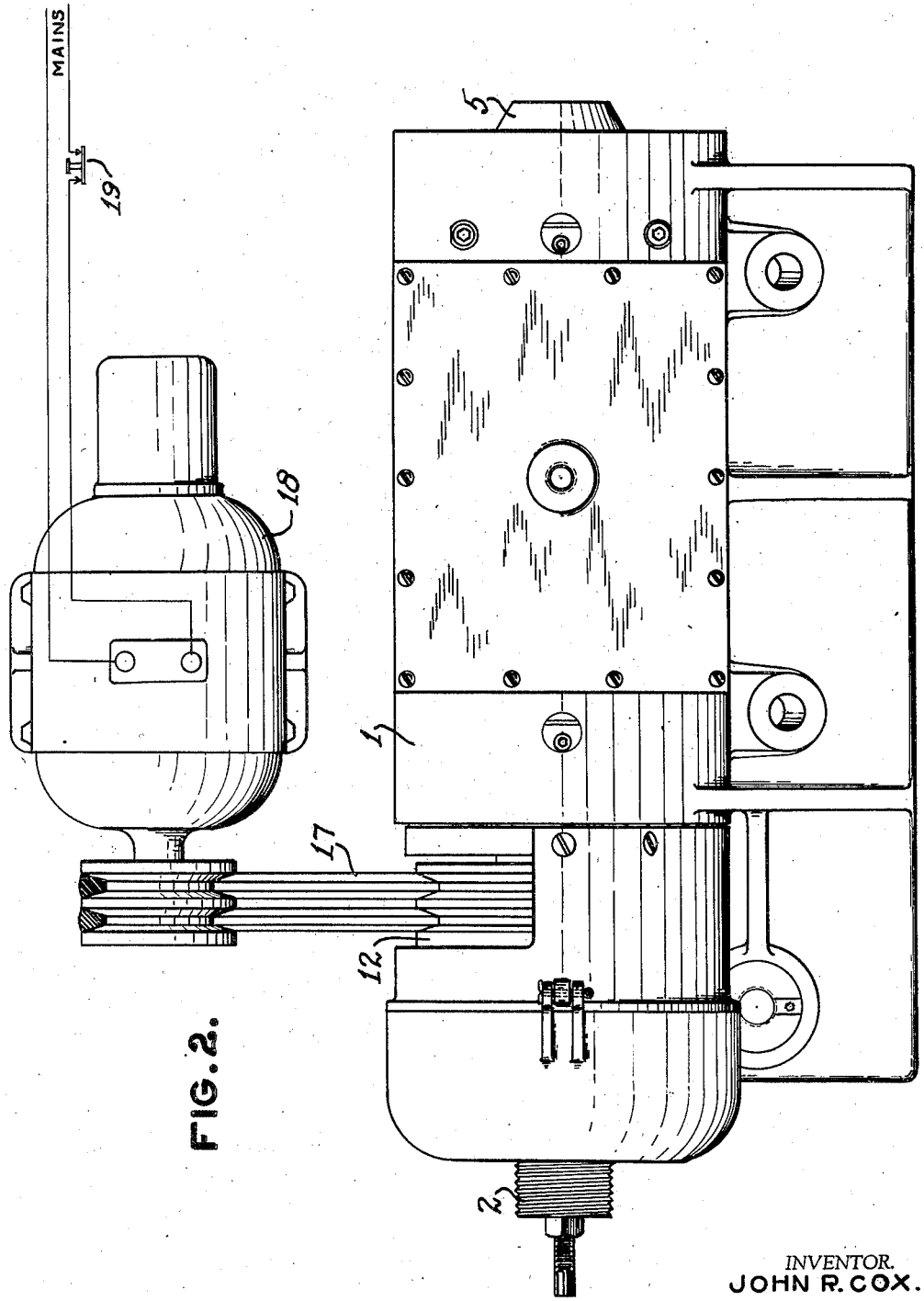
Fig. 2 is a top plan view thereof.
Figure 3:
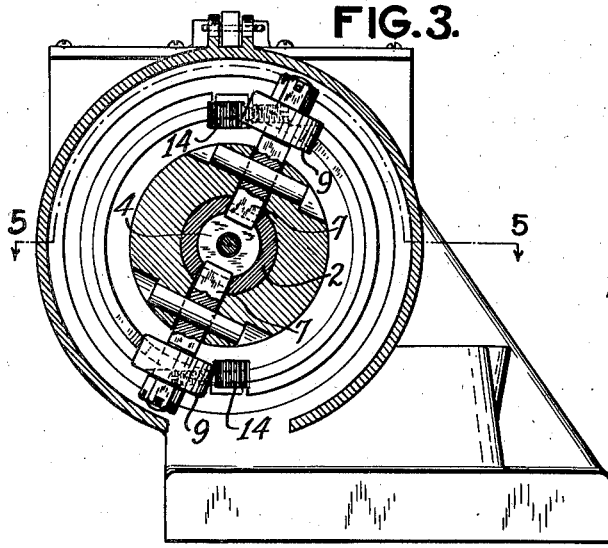
Fig. 3 is a view taken on line 3—3 of Fig. 1.
Figure 4:
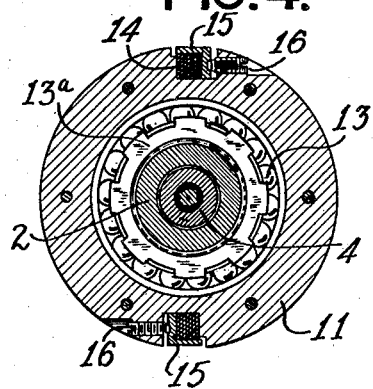
Fig. 4 is a view taken on line 4—4 of Fig. 1.
Figure 5:
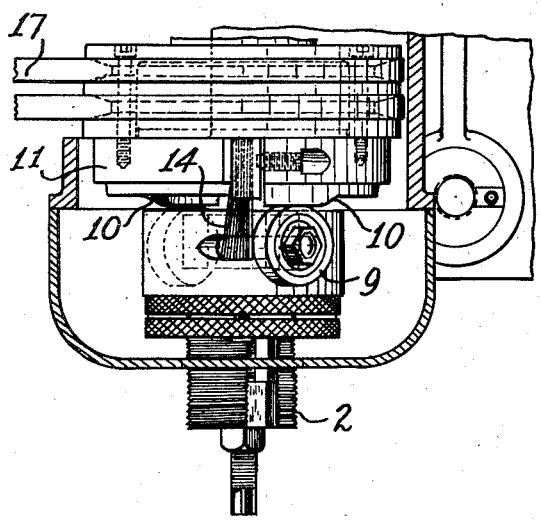
Fig. 5 is a view taken on line 5—5 of Fig. 3.

Suitably mounted within the housing 1 there is the rotatable hollow spindle 2 which has the collet 3 located at the one end thereof and the operating means therefor located at the other end thereof, as will be understood from Fig. 1 of the present drawings. Any suitable form of collet may be employed.

Figure 6:
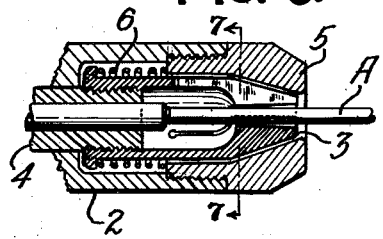
Fig. 6 is a partial view showing the collet in released position.
Figure 7:
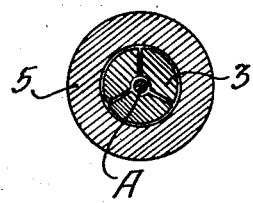
Fig. 7 is a view taken on line 7—7 of Fig. 6.

In the present illustration, the collet 3 is threaded upon the end of the hollow rod or push tube 4, while the tapered ends thereof are adapted for wedging engagement with the correspondingly inclined face of the removable end member 5 of the spindle, and the coil spring 6 is arranged between a flange of the collet 3 and the end of member 5. The function of spring 6 is to effect withdrawal of the collet from engaging position when released, as will be understood. In Fig. 1, the collet is shown in engagement with a piece of work A; while in Fig. 6, the collet is shown in released position for insertion or removal of the work.

It will be understood that the collet is caused to be engaged or disengaged by movement of the hollow rod 4 along the longitudinal axis thereof which corresponds with that of the collet, this rod 4 extending co-axially through the spindle 2. The mechanism for manipulating the rod 4 will now be described.

The one end portion of spindle 2 is slotted diametrically, as indicated at 2a, so as to permit the extension of the inner ends of the duplicate fingers or levers therethrough, the fingers 7 being pivotally mounted upon the ring 8 which is carried by the spindle 2. Thus the spindle and fingers 7 always rotate together. The inner ends of fingers 7 are adapted to engage the end of the hollow rod 4 so as to move the same towards the right when the inner ends of the fingers are rocked towards the rod. By means of the adjusting nut 8a, the finger holder 8 can be positioned so as to bring the fingers 7 in correct engagement with the hollow rod for clamping engagement with the collet at the other end of the device. The collet will be closed by a movement of rod 4 to the right a distance of approximately one-thirty-second (1/32) of an inch.

The outer ends of the fingers 7 have mounted thereupon the rollers 9 for engagement by the annular cam portions 10 of the cam ring member 11 which is attached to the drive pulley 12. The pulley 12 is concentrically and freely mounted upon the spindle 2 by means of the ball bearing indicated at 13. The ball bearing is locked in place against the shoulder of spindle 2 by means of nut 13a, and the ball bearing is capable of taking a thrust load as well as radial load.

At diametrically opposite points upon the cam member 11 there are provided slots for sets of leaf springs 14 within the angular clamps 15 which are secured in position by means of the set screws 16. These springs are located at the end of the high part of the cam 11, in each case, and the free ends of the spring leaves in each instance extend into the path of the roller 9. The rollers, after they have come into engagement with the high parts of the cam member, will engage the spring leaves and thereby effect a positive drive connection between the pulley 12 and spindle 2. Moreover, the cushioning effect of the spring leaves will absorb any shock which might otherwise be transmitted by a sudden engagement between these parts. Also, the spring leaves serve as a cushion stop means for the rollers 9 upon the other side thereof when the parts are released, as will be explained below.

The pulley 12 is driven by the belts 17 from any suitable form of motor with a brake for quick stopping. In the present case, I have shown an electric motor 18 with a magnetic brake. In the main line circuit I have provided the push button 19 by means of which the present device can be placed in operation for any desired period of time, this button being located within easy reach of the operator while operating the device.

The operation of the device will now be described. Assuming the spindle 2 to be at rest, the cam rollers 9 are opposite the low parts of the cam member and consequently the clamping rod 4 is free and the collet is in released position. Then upon depressing and holding the switch button in closed position, the magnetic brake of the motor is released and the pulley starts to rotate. Due to the inertia of spindle 2 and the finger-holder 8, these parts will remain still while the cam member 11 rotates and until the high parts 10 of the cam come into engagement with the rollers 9 and turn the inner ends of the fingers 7 towards the rod. This will cause the clamping rod 4 to move towards the right, as viewed in Fig. 1, and thereby close the collet into engagement with the work A which has been inserted into proper position by the operator. The rotary movement of the cam member 11, as just described, will cause the rollers 9 to be engaged by the leaf springs 14 and thereby effect a positive drive connection. Then the pulley 12, cam member 11, fingers 7, finger-holder 8 and spindle 2 rotate as a unit, with the collet in effective engagement with the work. Any shock which might otherwise be incident to effecting the positive drive connection, above referred to, is precluded by the cushioning effect of the bundles of leaf springs, as already explained.

When the switch 19 is opened for stopping the operation, the magnetic brake will cause the motor and consequently the pulley unit to stop quickly; but the spindle 2, due to momentum, continues to rotate and carries the fingers 7 with it. This relative movement between the cam member and the fingers causes the rollers 9 to move off of the high parts of the cam member and to come opposite the low parts thereof, with the result that the spring 6 then moves the rod 4 to the left, as viewed in Fig. 1, so as to release the collet from engagement with the work, and the inner ends of the fingers 7 are caused to turn away from rod 4. In case the relative rotary movement between the cam member 11 and the fingers 7 should continue to the end of the low parts of the cam member, the rollers 9 will finally be engaged by the other side of the leaf springs 14 so as to absorb any shock. Thus when the spindle stops, the collet is out of engagement with the work. Upon removal of the work therefrom, the above-described operation may be repeated as often as desired.

Notably among the advantages of this type of device is the increased quantity production in a given time due to the automatic feature above explained, and my present improved form of device is capable of performing the functions, as above recited, in a practical and efficient manner. Other advantages will be apparent to those who are familiar with the art to which this invention relates.

What I claim is:

1. An automatic chucking device comprising a rotatable collet, driving means therefor, operative connections actuated by said driving means for effecting engagement and disengagement of the collet with the work and for effecting connection and disconnection of the collet with said driving means, the engagement of the collet with the work taking place prior to the connection of the collet with the driving means and the disengagement of the collet from the work taking place subsequent to the disconnection of the collet from the driving means, whereby initiation of the driving means will automatically initiate said combined manipulations in the order named.

2. An automatic chucking device comprising a rotatable collet, co-axially disposed manipulatable means for effecting engagement of the collet with the work, rotatable drive means arranged co-axially with respect to said manipulatable means, cam and clutch means actuated by said rotatable drive means for effecting operation of said manipulatable means and for effecting drive connection for the collet with said rotatable drive means.

3. An automatic chucking device comprising a rotatable collet, co-axially disposed rotatable means therefor, said rotatable means including a longitudinally manipulatable means for effecting engagement of the collet with the work, companion rotatable means arranged co-axially with respect to said first rotatable means, cam means carried by said companion rotatable means, lever means carried by said first-named rotatable means and having operative engagement with said cam means and with said manipulatable means for effecting operation of said manipulatable means, and means carried by said companion rotatable means for engagement by said lever means so as to provide a drive connection between said two rotatable means, and means for operating said companion rotatable means.

4. An automatic chucking device comprising a rotatable collet, a co-axially disposed rotatable spindle, a longitudinally manipulatable rod, arranged within said spindle, for effecting engagement of the collet with the work, a rotatable ring surrounding said spindle, cam means carried by said ring, lever means carried by said spindle and extending therethrough so as to have operative relation at the inner end thereof with said rod and at the other end thereof with said cam means, and means carried by said ring for engagement by the outer end of said lever means so as to provide a rotary drive connection between said spindle and ring, and means for operating said ring.

5. An automatic chucking device comprising a rotatable collet, co-axially disposed freely mounted rotatable means therefor including longitudinally manipulatable means for effecting engagement of the collet with the work, companion rotatable means arranged co-axially about said first-named rotatable means, cam means carried by said companion rotatable means, lever means carried by said first-named rotatable means and having operative engagement with said cam means and with said manipulatable means for effecting operation of said manipulatable means, and means carried by said companion rotatable means for engagement by said lever means so as to provide an automatically engageable and releasable one-way drive connection between said two rotatable means, and means for operating said companion rotatable means.

6. An automatic chucking device comprising a rotatable collet, co-axially disposed freely mounted rotatable means therefor including longitudinally manipulatable means for effecting engagement of the collet with the work, companion rotatable means arranged co-axially about said first-named rotatable means, cam means carried by said companion rotatable means, lever means carried by said first-named rotatable means and having operative engagement with said cam means and with said manipulatable means for effecting operation of said manipulatable means, means for operating said companion rotatable means and means for stopping the same, and two-way cushion means carried by and extending from said companion rotatable means into the path of said lever means for cushioned engagement thereby so as to provide an automatically engageable and releasable one-way drive connection between said two rotatable means and to provide also a cushioned stop means for said lever means upon stopping said companion rotatable means.

7. An automatic chucking device comprising a rotatable collet, co-axially disposed freely mounted rotatable means therefor including longitudinally manipulatable means for effecting engagement of the collet with the work, companion rotatable means arranged co-axially about said first-named rotatable means, cam means carried by said companion rotatable means, lever means carried by said first-named rotatable means and having operative engagement with said cam means and with said manipulatable means for effecting operation of said manipulatable means, means providing operative connection between said two rotatable means with preliminary relative movement therebetween, and means for operating said companion rotatable means so as to effect preliminarily an automatic engagement of said collet through said lever means and said manipulatable means as a result of the initial movement of the companion rotatable means relatively to said first-named rotatable means, whereby the work will be engaged by the collet prior to the rotatable operation thereof.

8. An automatic chucking device comprising a rotatable collet, co-axially disposed freely mounted rotatable means therefor including longitudinally manipulatable means for effecting engagement of the collet with the work, companion rotatable means arranged co-axially about said first-named rotatable means, cam means carried by said companion rotatable means, lever means carried by said first-named rotatable means and having operative engagement with said cam means and with said manipulatable means for effecting operation of said manipulatable means, means providing operative connection between said two rotatable means with relative movement therebetween during the stopping operation, and disconnectible means for operating said companion rotatable means so as to effect an automatic release of said collet through said manipulatable means and said lever means as a result of continued movement of said first-named rotatable means relatively to said companion rotatable means, whereby the collet is automatically disengaged from the work upon stopping the device.

9. An automatic chucking device comprising a rotatable collet, co-axially disposed manipulatable means for effecting engagement of the collet with the work, rotatable drive means arranged co-axially with respect to said manipulatable means, means actuated by said rotatable drive means for effecting operation of said manipulatable means and for effecting drive connection of the collet with said rotatable drive means.

JOHN R. COX.